United States Patent
Feng et al.

(10) Patent No.: US 11,329,571 B1
(45) Date of Patent: May 10, 2022

(54) MAGNETIC BALANCE CIRCUIT OF BIDIRECTIONAL RESONANT CONVERTER AND THE CONTROL METHOD THEREOF

(71) Applicant: Shenzhen Vmax New Energy Co., Ltd., Guangdong (CN)

(72) Inventors: Yingying Feng, Guangdong (CN); Shun Yao, Guangdong (CN); Jinzhu Xu, Guangdong (CN); Hua Ao, Guangdong (CN)

(73) Assignee: Shenzhen Vmax New Energy Co., Ltd., Shenzhen (CN)

( * ) Notice: Subject to any disclaimer, the term of this patent is extended or adjusted under 35 U.S.C. 154(b) by 0 days.

(21) Appl. No.: 17/218,300

(22) Filed: Mar. 31, 2021

(30) Foreign Application Priority Data

Nov. 3, 2020 (CN) .......................... 202011211497.3

(51) Int. Cl.
*H02M 3/335* (2006.01)
*H02M 1/00* (2006.01)
*H02M 1/32* (2007.01)

(52) U.S. Cl.
CPC ... *H02M 3/33584* (2013.01); *H02M 3/33569* (2013.01); *H02M 3/33592* (2013.01); *H02M 1/0009* (2021.05); *H02M 1/0058* (2021.05); *H02M 1/32* (2013.01)

(58) Field of Classification Search
CPC ......... H02M 3/33584; H02M 3/33569; H02M 3/33592; H02M 1/0009; H02M 1/0058; H02M 1/32; H02M 5/2935
See application file for complete search history.

(56) References Cited

U.S. PATENT DOCUMENTS

| 5,633,577 | A  | * | 5/1997 | Matsumae | ........ H02M 3/33592 320/138 |
| 8,692,512 | B2 | * | 4/2014 | Tanikawa | ................ B60L 58/20 320/109 |
| 11,211,811 | B2 | * | 12/2021 | Liu | ........................ H02M 7/797 |
| 2007/0070655 | A1 | * | 3/2007 | Eguchi | .............. H02M 3/33592 363/17 |
| 2008/0101096 | A1 | * | 5/2008 | Takayanagi | ............... B60L 1/02 363/17 |
| 2010/0182803 | A1 | * | 7/2010 | Nan | .................. H02M 3/33592 363/21.02 |

(Continued)

*Primary Examiner* — Yusef A Ahmed
(74) *Attorney, Agent, or Firm* — Locke Lord LLP; Tim Tingkang Xia, Esq.

(57) ABSTRACT

A magnetic balance circuit of a bidirectional resonant converter and a control method thereof are provided. The magnetic balance circuit includes a primary conversion circuit, a transformer, a secondary conversion circuit, and a controller. Said primary conversion circuit is connected to a primary winding of said transformer through a first capacitor, a current transformer is set between the secondary winding of said transformer and said secondary conversion circuit. According to the positive component of the current in the cavity of the secondary conversion circuit and the negative component of the current in the cavity of the secondary conversion circuit, said controller further controls the duty ratios of the switches in the secondary conversion circuit. In the invention, the magnetic deviation phenomenon on both sides of the bidirectional resonant converter is effectively eliminated to achieve balance control for the magnetic circuit, thereby avoiding saturation.

10 Claims, 12 Drawing Sheets

(56) References Cited

U.S. PATENT DOCUMENTS

| | | | | |
|---|---|---|---|---|
| 2011/0249472 A1* | 10/2011 | Jain | ................... | H02M 3/33584 |
| | | | | 363/15 |
| 2013/0250623 A1* | 9/2013 | Xu | ..................... | H02M 3/33507 |
| | | | | 363/17 |
| 2015/0015181 A1* | 1/2015 | Kondo | .............. | H02M 3/33584 |
| | | | | 320/103 |
| 2015/0244279 A1* | 8/2015 | Takagi | .............. | H02M 3/33584 |
| | | | | 363/17 |
| 2015/0333634 A1* | 11/2015 | Yoshida | ............ | H02M 3/33507 |
| | | | | 363/21.03 |
| 2015/0365005 A1* | 12/2015 | Panov | ............... | H02M 3/33584 |
| | | | | 307/24 |
| 2016/0105119 A1* | 4/2016 | Akamatsu | ........... | H02M 7/4807 |
| | | | | 363/21.04 |
| 2016/0344297 A1* | 11/2016 | Lee | ................... | H02M 3/33592 |
| 2017/0324347 A1* | 11/2017 | Xu | ..................... | H02M 3/33584 |
| 2017/0366099 A1* | 12/2017 | Li | ..................... | H02M 3/33584 |
| 2018/0054136 A1* | 2/2018 | Jimichi | ................... | H02M 1/38 |
| 2019/0097544 A1* | 3/2019 | Albertini | ........... | H02M 3/33592 |
| 2019/0222050 A1* | 7/2019 | Liu | ..................... | H02J 7/00714 |
| 2020/0052498 A1* | 2/2020 | Liu | ................... | H02M 3/33523 |
| 2020/0212816 A1* | 7/2020 | Sun | .......................... | H02J 7/00 |
| 2020/0251985 A1* | 8/2020 | Lu | ........................... | H02M 1/10 |
| 2020/0266717 A1* | 8/2020 | Murakami | ........ | H02M 3/33561 |
| 2020/0328689 A1* | 10/2020 | Xu | ..................... | H02M 3/33592 |
| 2021/0155100 A1* | 5/2021 | Khaligh | .................... | H02J 7/02 |
| 2021/0384840 A1* | 12/2021 | Kumar | .............. | H02M 3/33584 |

\* cited by examiner

US 11,329,571 B1

MAGNETIC BALANCE CIRCUIT OF BIDIRECTIONAL RESONANT CONVERTER AND THE CONTROL METHOD THEREOF

CROSS-REFERENCE TO RELATED PATENT APPLICATION

This application claims priority to Chinese Patent Application No. 202011211497.3 filed in China on Nov. 3, 2020. The disclosure of the above application is incorporated herein in its entirety by reference.

TECHNICAL FIELD

The invention relates to a power converter, in particular a magnetic balance circuit of a bidirectional resonant converter and a control method thereof.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With the popularity of bidirectional isolation topology, especially in applications such as vehicle-mounted OBC, photovoltaics, and energy storage, it is more urgent to have isolation transformers and need bidirectional power transmission. At present, in the traditional topologies of bidirectional power transmission, the topologies such as bidirectional resonant topology (CLLC), dual active switch topology (DAB), full-bridge series-resonant topology (DBSRC) are mainly prevalent. In these topologies, as it needs to take the magnetic balance problem into account, capacitors need to be connected in series in both the primary loop and the secondary loop, and the DC component is blocked by utilizing the capacitor's characteristic such as "blocking DC passing AC" to solve the magnetic balance problem. In the DAB structure, there are some solutions that need to add current transformers (CT) on both sides at the same time to solve the magnetic balance problem by a complex mode of controlling peak current.

The above solution has the following disadvantages:

1. Capacitors are connected in series on both sides of the power. If the energy that needs to be transmitted is high, the current is often quite higher. At this time, the volume and cost of the capacitors will be significantly increased, which reduces the competitiveness of the product.

2. The solution to the magnetic balance problem by the mode of controlling peak current can only be applied to the DAB topology, and has so high requirement of control algorithm that it needs to use the internal comparator of the DSP, so it is basically impossible to achieve upgrading with a three-port on this basis.

3. The mode of controlling peak current cannot be used in controlling the DBSRC, instead, only capacitors need to be added on both sides of the power. Some capacitors are used to achieve resonance, and the other capacitors are used for the purpose of "blocking DC passing AC".

Therefore, how to design a method for controlling peak current that is appropriately applied to isolated DCDC structure with bidirectional transmission function, and can achieve balance control for the magnetic circuit, thereby avoiding saturation, and with possibility of eliminating the DC blocking capacitor is a technical problem to be solved urgently in the industry.

SUMMARY

In order to solve the above-mentioned defects in the prior art, the invention presents a magnetic balance circuit of a bidirectional resonant converter and a control method thereof.

The technical solution adopted by the present invention is to design a magnetic balance circuit of a bidirectional resonant converter, comprising a primary conversion circuit, a transformer, a secondary conversion circuit, and a controller, the primary conversion circuit is connected to a primary winding W1 of said transformer through a first capacitor C1, a current transformer CT is set between the secondary winding of said transformer and said secondary conversion circuit, according to the positive component Ipositive of the current in the cavity of the secondary conversion circuit and the negative component Inegative of the current in the cavity of the secondary conversion circuit, said controller further controls the duty ratios of the switches in the secondary conversion circuit.

Said secondary conversion circuit includes a secondary first conversion circuit, and said secondary first conversion circuit is connected to a first secondary winding W2 of said transformer.

Said secondary conversion circuit includes a secondary first conversion circuit and a secondary second conversion circuit, said secondary first conversion circuit is connected to the first secondary winding W2 of said transformer, said current transformer CT is set between the secondary first conversion circuit and the first secondary winding W2 of said transformer, said secondary second conversion circuit is connected with a second secondary winding W3 of said transformer and a third secondary winding W4 of said transformer.

Said first conversion circuit includes a $5^{th}$ switch Q5, a $6^{th}$ switch Q6, a $7^{th}$ switch Q7, and an $8^{th}$ switch Q8, wherein the $5^{th}$ switch Q5 and the $7^{th}$ switch Q7 are connected in series up and down to form a first bridge arm, and the $6^{th}$ switch Q6 and the $7^{th}$ switch Q8 are connected in series up and down to form a second bridge arm, the $5^{th}$ switch Q5 and the $8^{th}$ switch Q8 operate synchronously, and the $6^{th}$ switch Q6 and the $7^{th}$ switch Q7 operate synchronously.

A method for controlling a magnetic balance circuit of a bidirectional resonant converter, said balance circuit includes said magnetic balance circuit of a bidirectional resonant converter, and said control method comprises: collecting the positive component Ipositive of the current in the cavity of said secondary conversion circuit and the negative component Inegative of the current in the cavity of said secondary conversion circuit, and controlling the duty ratios of the switches in said secondary conversion circuit according to the collected component.

Said method further comprises: performing an integral operation on the positive component Ipositive to obtain a positive component integral Is$^+$, performing an integral operation on the negative component Inegative to obtain a negative component integral Is$^-$, subtracting said negative component integral Is$^-$ from said positive component integral Is$^+$ to obtain difference Is, when the difference Is is greater than zero, the duty ratios of the $6^{th}$ switch Q6 and the $7^{th}$ switch Q7 are set to 50%, and the duty ratios of the $5^{th}$ switch Q5 and the $8^{th}$ switch Q8 are reduced.

when the difference Is is less than zero, the duty ratios of the 5$^{th}$ switch Q5 and the 8$^{th}$ switch Q8 are set to 50%, and the duty ratios of the 6$^{th}$ switch Q6 and the 7$^{th}$ switch Q7 are reduced.

when the difference Is is equal to zero, the duty ratios of the 5$^{th}$ switch Q5, the 6$^{th}$ switch Q6, the 7$^{th}$ switch Q7, and the 8$^{th}$ switch Q8 are not changed.

The method for controlling a magnetic balance circuit of a bidirectional resonant converter in one design scheme, comprises the following steps: S1: collecting the positive component Ipositive of the current in the cavity of said secondary conversion circuit and the negative component Inegative of the current in the cavity of said secondary conversion circuit; S2: performing an integral operation on the positive component Ipositive to obtain a positive component integral Is$^+$, performing an integral operation on the negative component Inegative to obtain a negative component integral Is$^-$; S3: subtracting said negative component integral Is$^-$ from said positive component integral Is$^+$ to obtain difference Is; S4: Judging whether the difference Is is greater than zero, if yes, shifting to step 5, otherwise shifting to step 6; S5: setting the duty ratios of the 6$^{th}$ switch Q6 and the 7$^{th}$ switch Q7 to 50%, and reducing the duty ratios of the 5$^{th}$ switch Q5 and the 8$^{th}$ switch Q8, shifting to step 9; S6: Judging whether the difference Is is less than zero, if yes, shifting to step 7, otherwise shifting to step 8; S7: setting the duty ratios of the 5$^{th}$ switch Q5 and the 8$^{th}$ switch Q8 to 50%, and reducing the duty ratios of the 6$^{th}$ switch Q6 and the 7$^{th}$ switch Q7, shifting to step 9; S8: not changing the duty ratios of the 5$^{th}$ switch Q5, the 6$^{th}$ switch Q6, the 7$^{th}$ switch Q7, and the 8$^{th}$ switch Q8, shifting to step 9; S9: finishing adjusting the duty ratio.

The method for controlling a magnetic balance circuit of a bidirectional resonant converter in another design scheme, comprises the following steps: S1: collecting the positive component Ipositive of the current in the cavity of said secondary conversion circuit and the negative component Inegative of the current in the cavity of said secondary conversion circuit; S2: performing an integral operation on the positive component Ipositive to obtain a positive component integral Is$^+$, performing an integral operation on the negative component Inegative to obtain a negative component integral Is$^-$; S3: subtracting said negative component integral Is$^-$ from said positive component integral Is$^+$ to obtain difference Is; S4: subtracting the current adjustment parameter Iref from the difference Is, and then performing the 2p2z loop calculation to obtain the loop result Loopout; S5: Judging whether the loop result Loopout is greater than zero, if yes, shifting to step 6, otherwise shifting to step 7; S6: setting the duty ratios of the 5$^{th}$ switch Q5 and the 8$^{th}$ switch Q8 to 50%, and reducing the duty ratios of the 6$^{th}$ switch Q6 and the 7$^{th}$ switch Q7, shifting to step 10; S7: Judging whether the loop result Loopout is less than zero, if yes, shifting to step 8, otherwise shifting to step 9; S8: setting the duty ratios of the 6$^{th}$ switch Q6 and the 7$^{th}$ switch Q7 to 50%, and reducing the duty ratios of the 5$^{th}$ switch Q5 and the 8$^{th}$ switch Q8, shifting to step 10; S9: not changing the duty ratios of the 5$^{th}$ switch Q5, the 6$^{th}$ switch Q6, the 7$^{th}$ switch Q7, and the 8$^{th}$ switch Q8, shifting to step 10; S10: finishing adjusting the duty ratio.

In a preferred embodiment, said current adjustment parameter Iref is equal to 0.

The beneficial effect of the technical solution presented by the invention is as follows:

In the invention, the magnetic deviation phenomenon on both sides of the bidirectional resonant converter is effectively eliminated to achieve balance control for the magnetic circuit, thereby avoiding saturation, and the DC blocking capacitors on the secondary loop are cancelled, reducing the volume and cost of the equipment, instead, less components are only added on the basis of the original bidirectional resonant converter, improving the product's competitiveness.

BRIEF DESCRIPTION OF THE DRAWINGS

The invention is described in detail below in conjunction with embodiments and drawings.

DETAILED DESCRIPTION

In order to make the objectives, technical solutions, and advantages of the invention clearer, the invention is further described in detail with reference to the drawings and the embodiments as follows. It should be understood that the specific embodiments described here are only used to explain the invention, but not used to limit the invention.

The invention intends to use a control method to suppress this magnetic deviation phenomenon. Especially in the full-bridge series-resonant topology (DBSRC), the primary resonant capacitor and resonant inductor form a resonant cavity, and in the secondary conversion circuit, the DC blocking capacitor can be cancelled by a current transformer and the control algorithm filed for patent application. For example, C2 in the circuit diagram of the two-port DCDC converter in the prior art shown in FIG. 1 can be eliminated.

Figure 1:
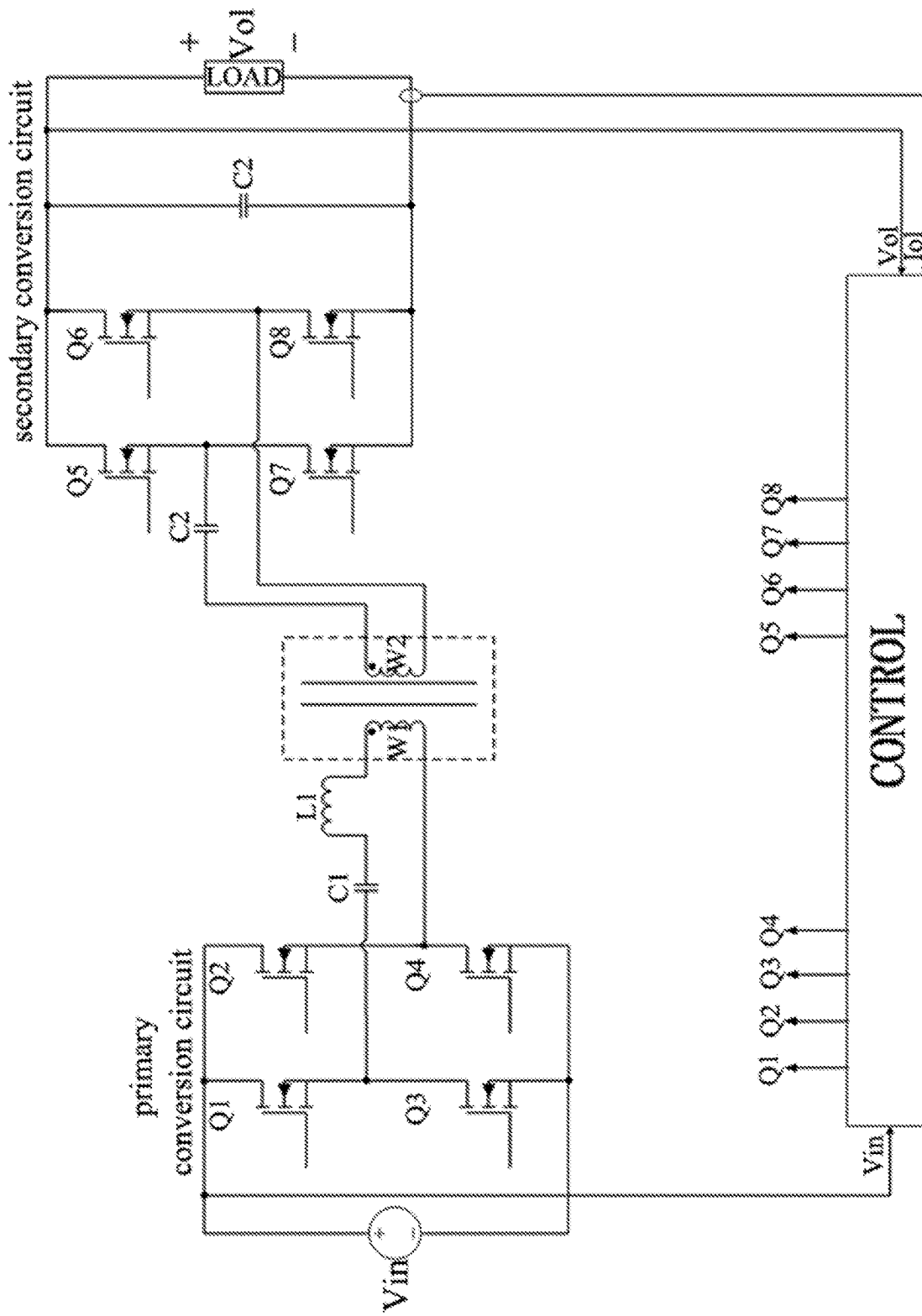
FIG. 1 is a circuit diagram of an existing two-port DCDC converter.
Figure 2:
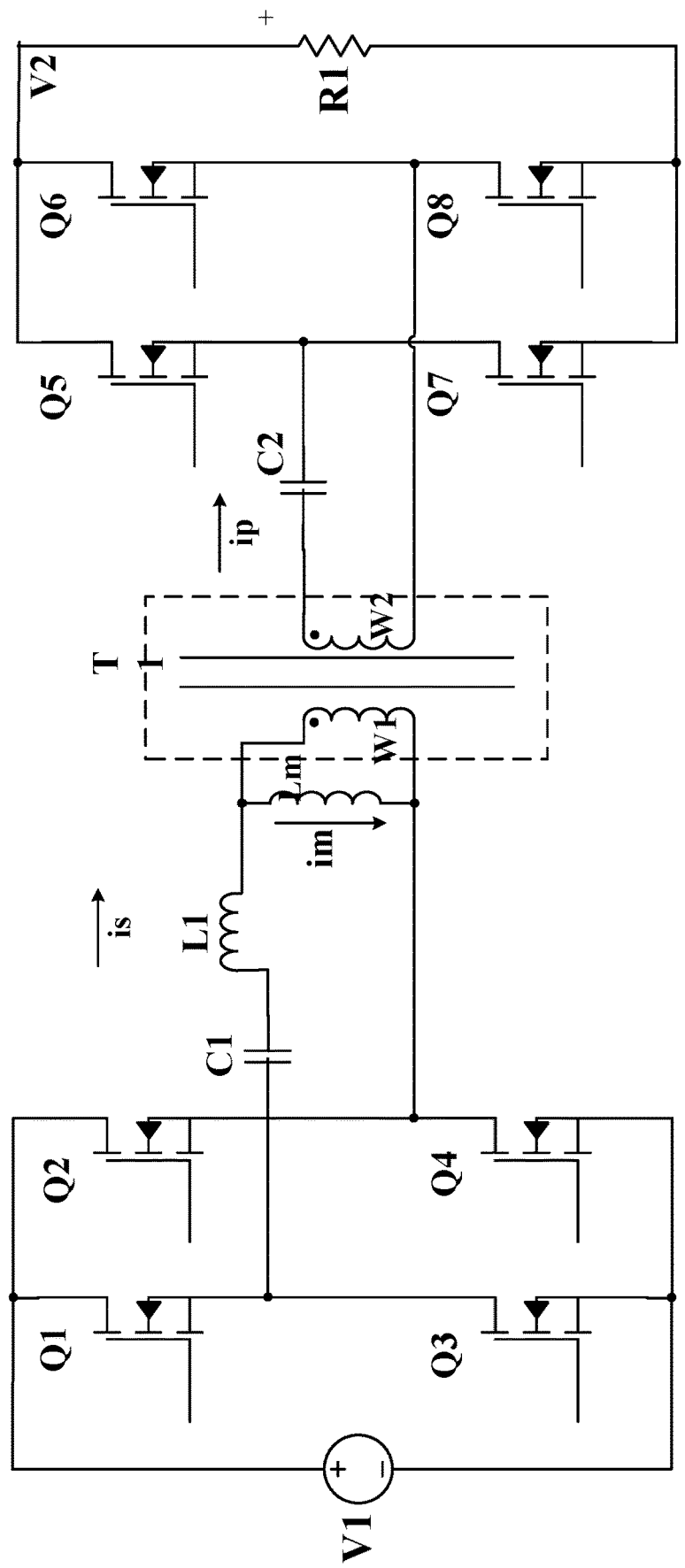
FIG. 2 is the topological equivalent diagram of FIG. 1.

FIG. 2 shows the topological equivalent of FIG. 1, where, Is is the current in the primary resonant cavity, Im is the excitation current, and Ip is the current in the secondary cavity.

With the existence of this topology C1, the following equation can be obtained by utilizing the capacitor's characteristic such as "blocking DC passing AC".

$$\int_0^T i_s dt = 0 \quad \int_0^T i_s dt = 0. \tag{1}$$

It is ensured that the L1 inductor will not saturate. The existence of the secondary capacitor C2 brings about $$\int_t^{t+T} i_p dt = 0. \quad (2)$$

Since the transformer excitation current is $$i_m = i_s - \frac{N_s}{N_p} i_p, \quad (3)$$

for the transformers, $$\int_0^T i_m dt = \int_0^T \left( i_s - \frac{N_s}{N_p} i_p \right) dt = \int_0^T i_s dt - \frac{N_s}{N_p} \int_0^T i_p dt = 0 \quad (4)$$

exists.

As for the Equation (4), as long as the primary current integral is 0 and the secondary integral is 0, it can be guaranteed that the transformer will not saturate.

The disadvantage of the existing circuit shown in FIG. 1 is that the cost of the C2 capacitor is relatively high, and the charge-discharge characteristic of the capacitor is used to maintain $$\int_t^{t+T} i_p dt = 0.$$

The secondary current integral of this topology is maintained as zero by changing the duty ratio of the secondary switch tube. The circuit is shown in FIG. 3.

Figure 3:
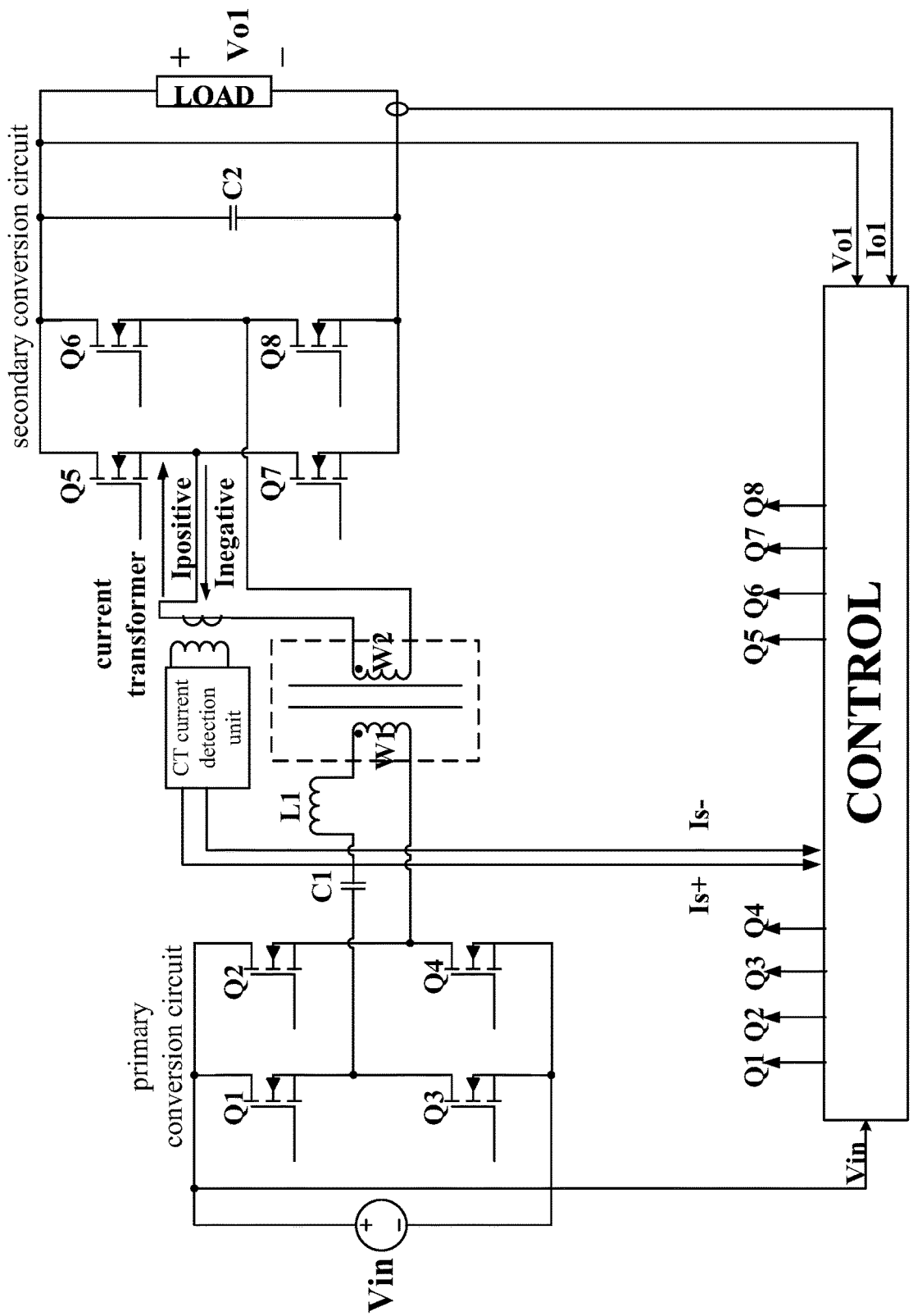
FIG. 3 is the circuit diagram of the invention's two-port DCDC converter.

In FIG. 3, $I_s^+$ and $I_s^-$ are respectively:

$$I_{s+} = \int_0^T I_{positive} dt;$$

Where, Ipositive refers to the positive component of the current in the cavity of the secondary conversion circuit $$I_{s-} = \int_0^T I_{negative} dt;$$

where, Inegative refers to the negative component of the current in the cavity of the secondary conversion circuit.

The controller will synchronously sample the signals of $I_s^+$ and $I_s^-$, and control the values of the two signals to be equal, which is the following formula:

$$I_{s+} = I_{s-}.$$

That is:

$$\int_0^T I_{positive} dt = \int_0^T I_{negative} dt.$$

Thus, the current integral of the secondary conversion circuit is 0:

$$\int_0^T I_{positive+Inegative} dt = 0.$$

If $I_{s+} = I_{s-}$ is not established at this time, such as $I_{s+} > I_{s-}$, or $I_{s+} < I_{s-}$, the duty ratio of one or two of Q5, Q6, Q7, and Q8 is controlled to achieve forward or reversely partly slightly adjusting current in the cavity of the secondary conversion circuit, and then obtains $I_{s+} = I_{s-}$.

For example, $I_{s+} > I_{s-}$, at this time, the forward component current of the current in the secondary conversion circuit cavity is greater than the reverse component current. As shown in FIG. 3, the path for constructing the forward component current is: Q6, Q7 are switched on, and Q5, Q8 are switched off. The goal is to reduce $Is^+$ or increase $Is^-$. In the implementation case, we can shorten the conduction time of Q6 and Q7, thereby reducing $Is^+$, and achieving the goal of $I_{s+} = I_{s-}$.

Figure 4:
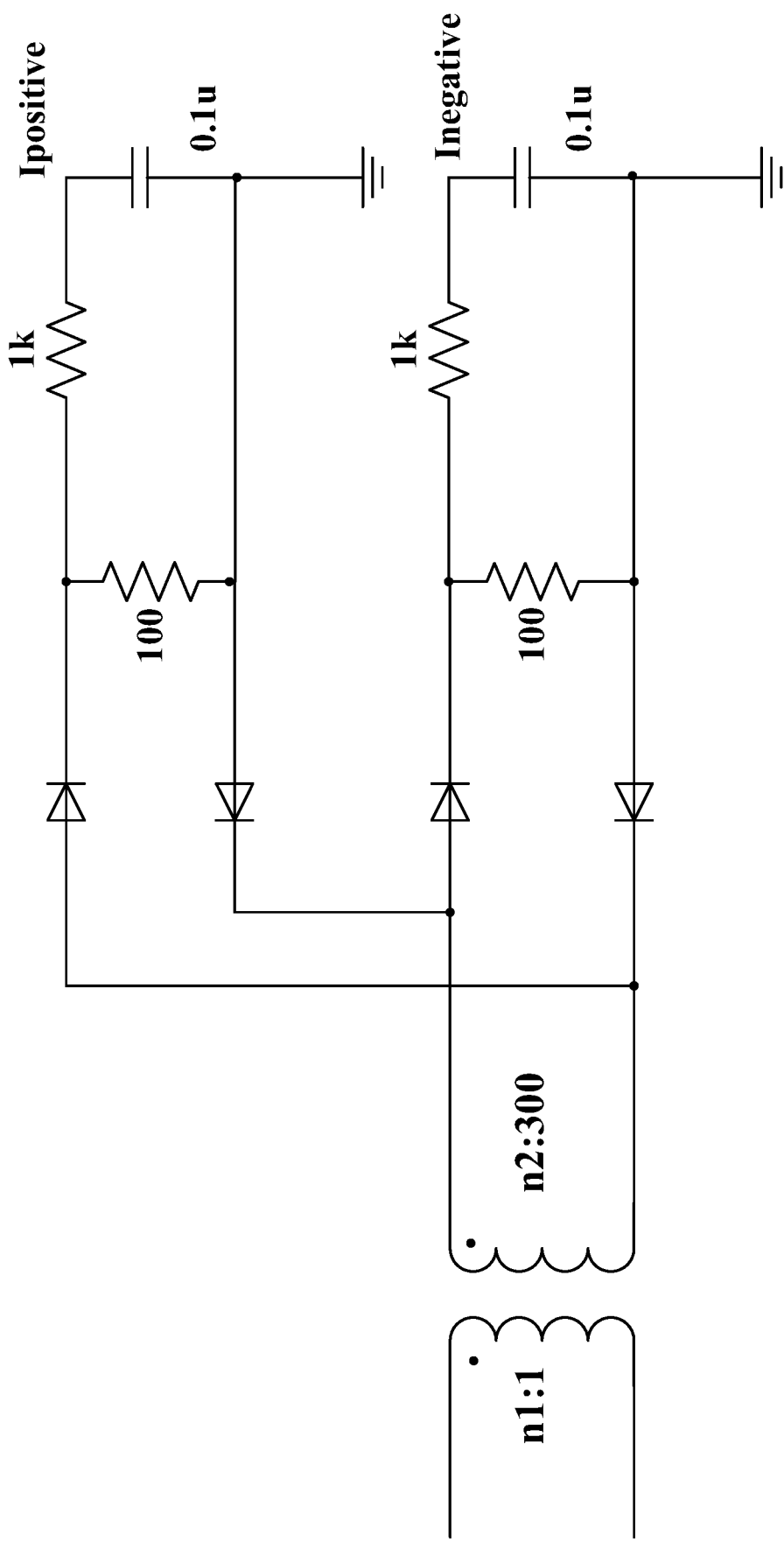
FIG. 4 is the circuit diagram of the CT current detection circuit in the invention's preferred embodiment.
Figure 5:
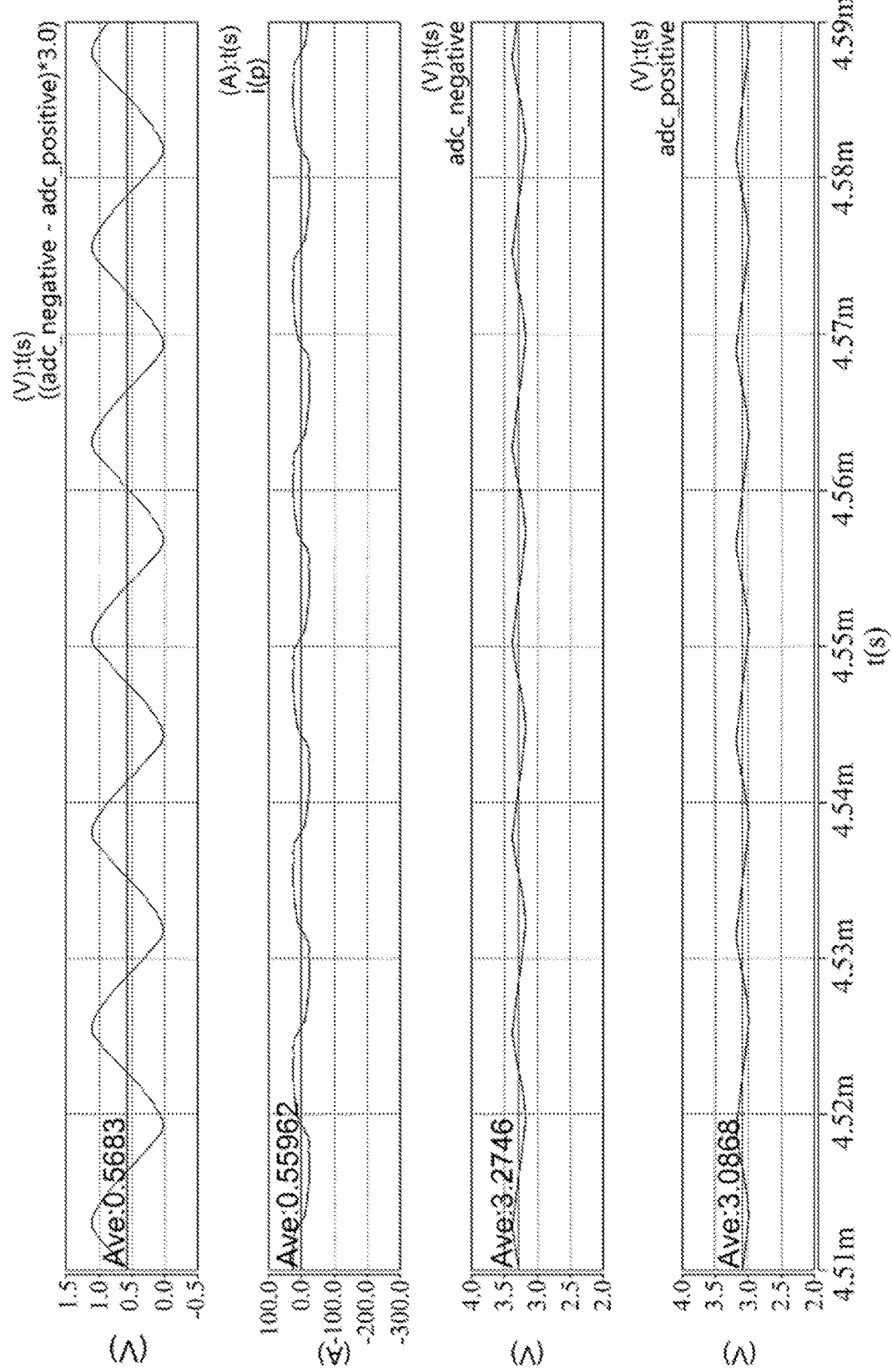
FIG. 5 is the simulation diagram of the current and voltage waveforms of the circuit in FIG. 3.
Figure 6:
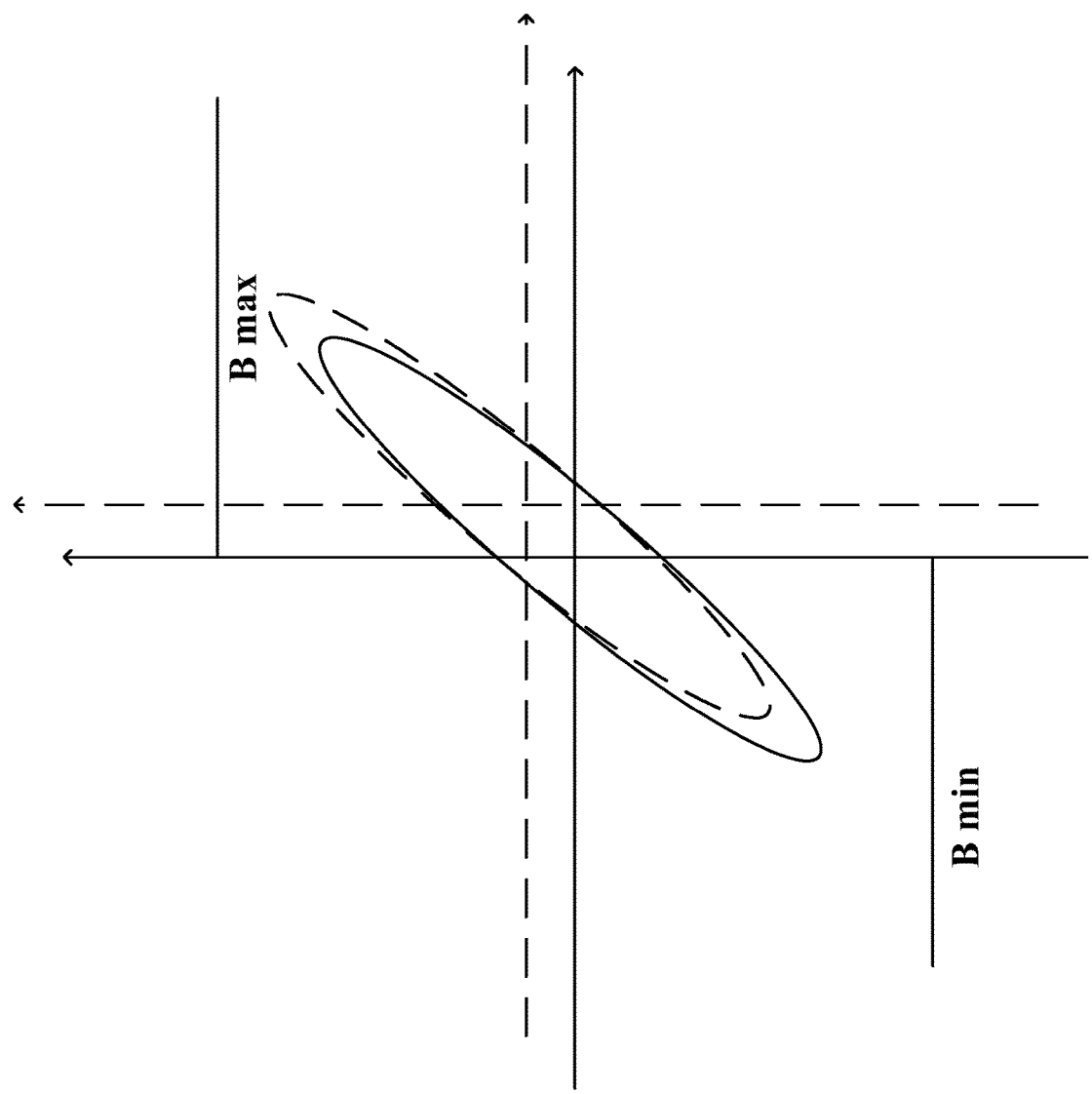
FIG. 6 is the schematic diagram of the circuit's magnetization curve in FIG. 3.

The design example of CT current detection unit is shown as in FIG. 4. Based on this design, build a simulated waveform and carry out simulation. The simulated waveform is shown in FIG. 5. In FIG. 5, the current value, 0.5683 A, of the difference between Ipositive and Inegative, is basically close to the DC component, 0.55962 A, of the current in the cavity measured directly. Considering the discrete types such as diodes and resistors, it is inevitable that there will be a certain difference between the both. But according to Ampere Rule, $H*l=N*I$; where $H=B/\mu$, a certain amount of DC I will produce a certain amount of $B^-$ value magnetic biasing, and you only need to control the $B^-$ value magnetic biasing to ensure that there will be no magnetic saturation during the process. As shown in FIG. 6, the expected magnetization curve is a solid line "-", and considering the deviation of the actual hardware sampling, the actual magnetization curve is a dashed line "---". However, the overall Bmax and Bmin limit is still not exceeded, and this operation is still safe.

The above control method is applied to the two-port circuit of the full-bridge series resonant topology (DBSRC), which can be extended to the three-port magnetic integrated topology (I series) solution. In the past control solutions, DC blocking capacitors are required. For example, in FIG. 7, C4 is a DC blocking capacitor.

Figure 8:
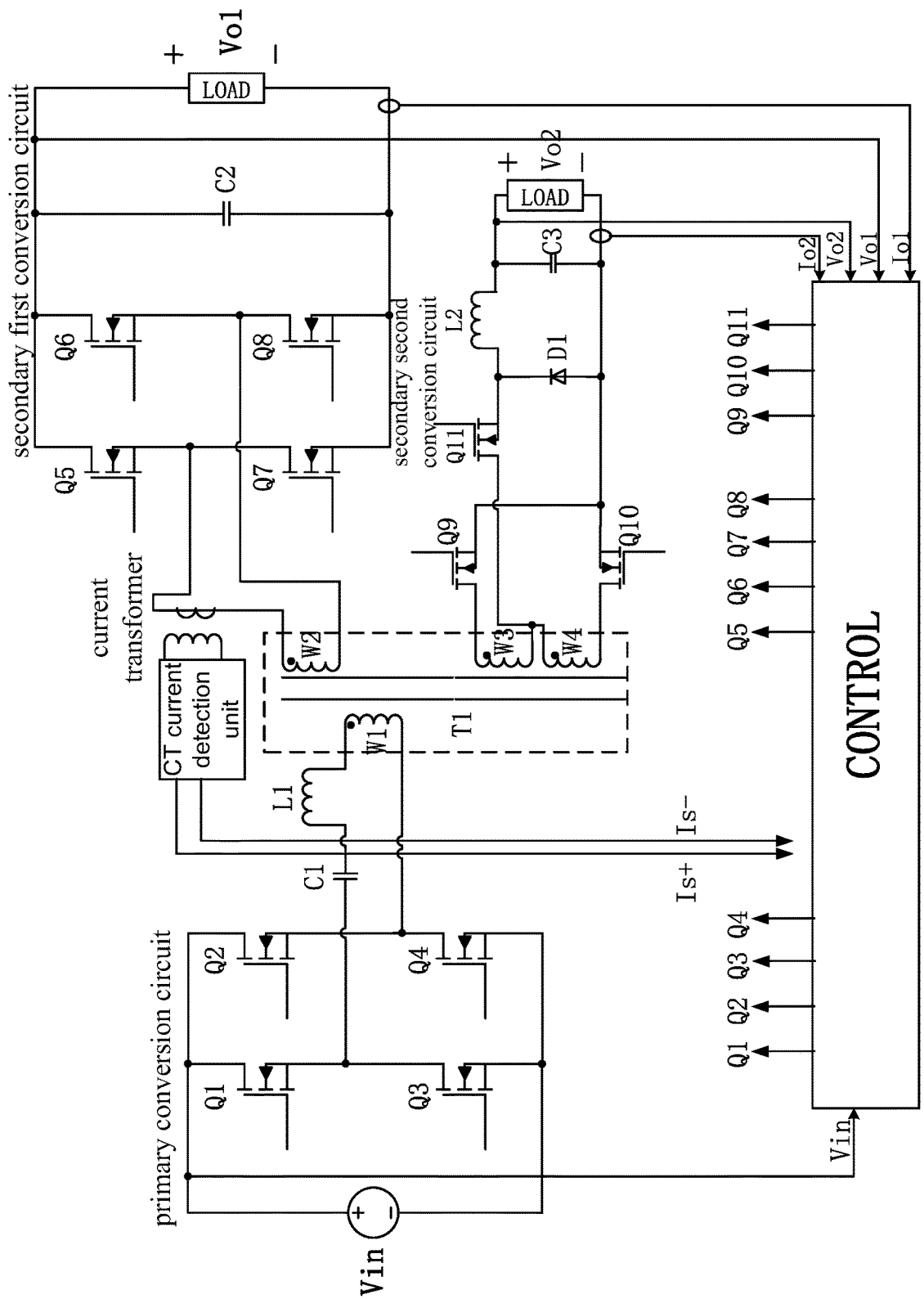
FIG. 8 is the circuit diagram of the invention's three-port DCDC converter.

Just for the existence of C4, when the power transmission from the secondary first conversion circuit to the secondary second conversion circuit is simply controlled, only the peak current control mode can be adopted. When we adopt the magnetic balance control method of the invention, the circuit diagram shown in FIG. 8 can be used. It can be seen from FIG. 8 that the original DC blocking capacitors can be eliminated to further increase the power density of the three-port magnetic integrated topology (I series) and further enhance the competitiveness of products for customers.

Figure 9:
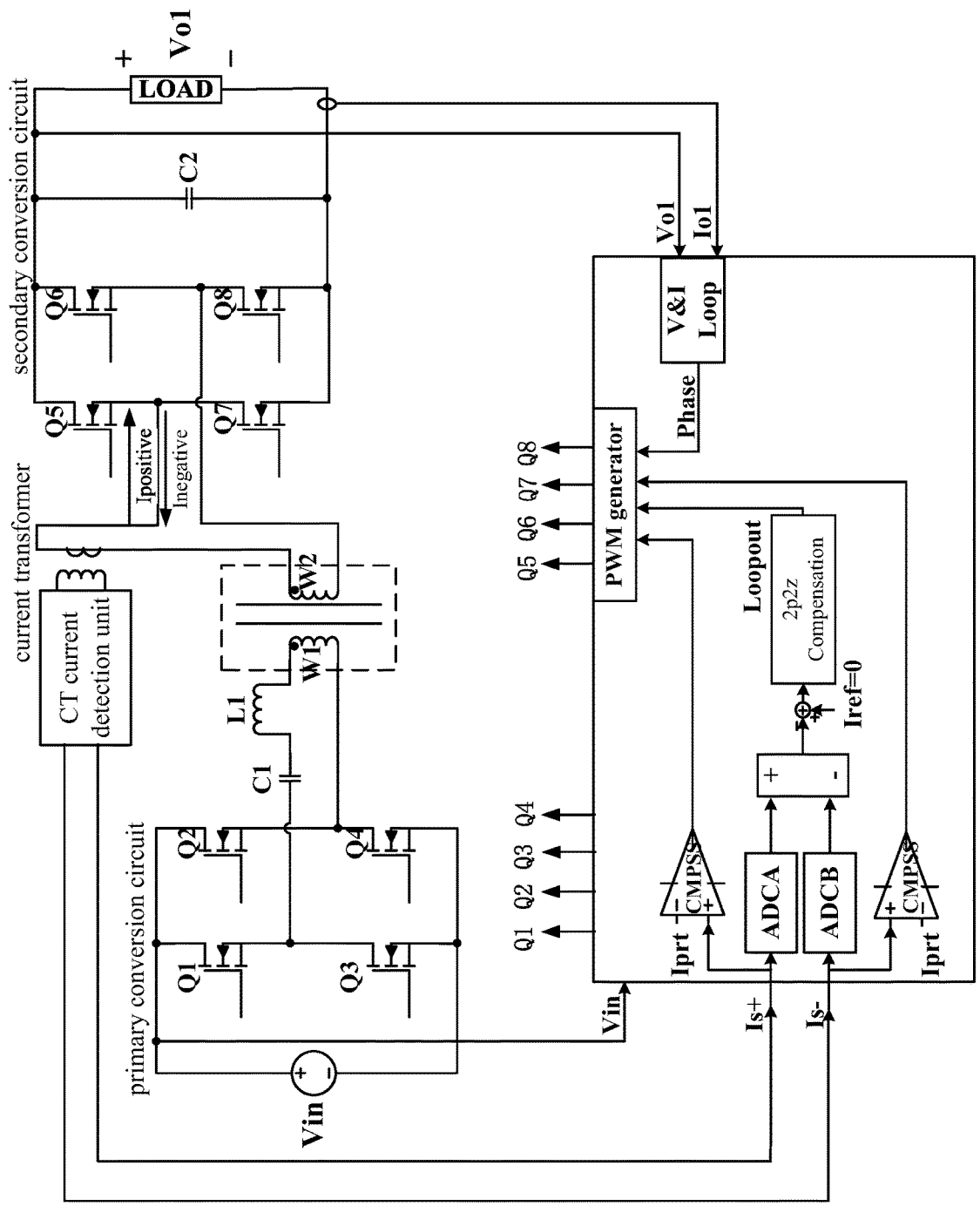
FIG. 9 is the control principle diagram of the invention's preferred embodiment.

FIG. 9 shows the control principle block diagram of the invention. ADCA and ADCB respectively sample $Is^+$ and $Is^-$ and perform corresponding integration, and then perform subtraction. The given reference is 0, thereby performing PID process and outputting PWM control signal of Q6, Q7, Q5, Q8.

The present invention discloses a magnetic balance circuit of a bidirectional resonant converter, refers to FIG. 3, comprising a primary conversion circuit, a transformer, a secondary conversion circuit, and a controller, wherein said primary conversion circuit is connected to a primary winding W1 of said transformer through a first capacitor C1, a current transformer CT is set between the secondary winding of said transformer and said secondary conversion circuit, according to the positive component Ipositive of the current in the cavity of the secondary conversion circuit and the negative component Inegative of the current in the cavity of the secondary conversion circuit, said controller further controls the duty ratios of the switches in the secondary conversion circuit.

In an embodiment, the secondary conversion circuit includes a secondary first conversion circuit, and the secondary first conversion circuit is connected to the first secondary winding W2 of the transformer. This embodiment gives an example of a two-port DCDC converter, which is applied to a vehicle-mounted charger. Its primary conversion circuit can be connected to a charging pile (or commercial power supply), and its secondary first conversion circuit can be connected to a high-voltage battery in the vehicle.

Figure 7:
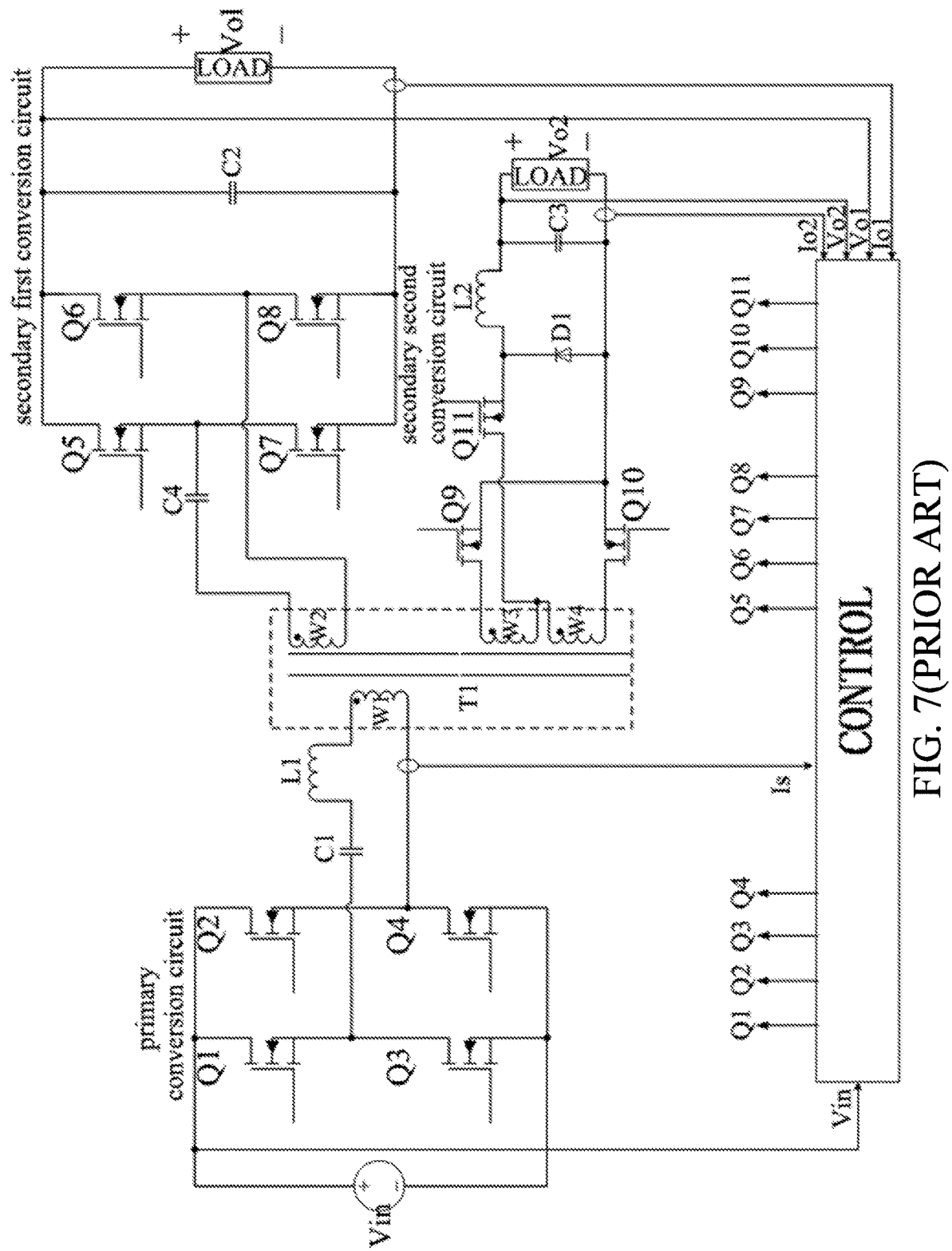
FIG. 7 is a circuit diagram of an existing three-port DCDC converter.

With reference to another embodiment shown in FIG. 7, said secondary conversion circuit includes a secondary first conversion circuit and a secondary second conversion circuit, said secondary first conversion circuit is connected to the first secondary winding W2 of said transformer, said current transformer CT is set between the secondary first conversion circuit and the first secondary winding W2 of said transformer, said secondary second conversion circuit is connected with a second secondary winding W3 of said transformer and a third secondary winding W4 of said transformer. This embodiment gives an example of a three-port DCDC converter, which is applied to a vehicle-mounted charger. Its primary conversion circuit can be connected to a charging pile (or commercial power supply), and its secondary first conversion circuit can be connected to a high-voltage battery in the vehicle. and the secondary second conversion circuit can be connected to the low-voltage equipment in the vehicle.

In a preferred embodiment, said first conversion circuit includes a $5^{th}$ switch Q5, a $6^{th}$ switch Q6, a $7^{th}$ switch Q7, and an $8^{th}$ switch Q8, wherein the $5^{th}$ switch Q5 and the $7^{th}$ switch Q7 are connected in series up and down to form a first bridge arm, and the $6^{th}$ switch Q6 and the $7^{th}$ switch Q8 are connected in series up and down to form a second bridge arm, the $5^{th}$ switch Q5 and the $8^{th}$ switch Q8 operate synchronously, and the $6^{th}$ switch Q6 and the $7^{th}$ switch Q7 operate synchronously.

The present invention also discloses a method for controlling a magnetic balance circuit of a bidirectional resonant converter, said balance circuit includes said magnetic balance circuit of a bidirectional resonant converter, and said control method comprises: collecting the positive component Ipositive of the current in the cavity of said secondary conversion circuit and the negative component Inegative of the current in the cavity of said secondary conversion circuit, and controlling the duty ratios of the switches in said secondary conversion circuit according to the collected component.

In a preferred embodiment, said method further comprises: performing an integral operation on the positive component Ipositive to obtain a positive component integral $Is^+$, performing an integral operation on the negative component Inegative to obtain a negative component integral $Is^-$, subtracting said negative component integral $Is^-$ from said positive component integral $Is^+$ to obtain difference Is; when the difference Is is greater than zero, the duty ratios of the $6^{th}$ switch Q6 and the $7^{th}$ switch Q7 are set to 50%, and the duty ratios of the $5^{th}$ switch Q5 and the $8^{th}$ switch Q8 are reduced. When the difference Is is less than zero, the duty ratios of the $5^{th}$ switch Q5 and the $8^{th}$ switch Q8 are set to 50%, and the duty ratios of the $6^{th}$ switch Q6 and the $7^{th}$ switch Q7 are reduced. When the difference Is is equal to zero, the duty ratios of the $5^{th}$ switch Q5, the $6^{th}$ switch Q6, the $7^{th}$ switch Q7, and the $8^{th}$ switch Q8 are not changed.

Figure 11:
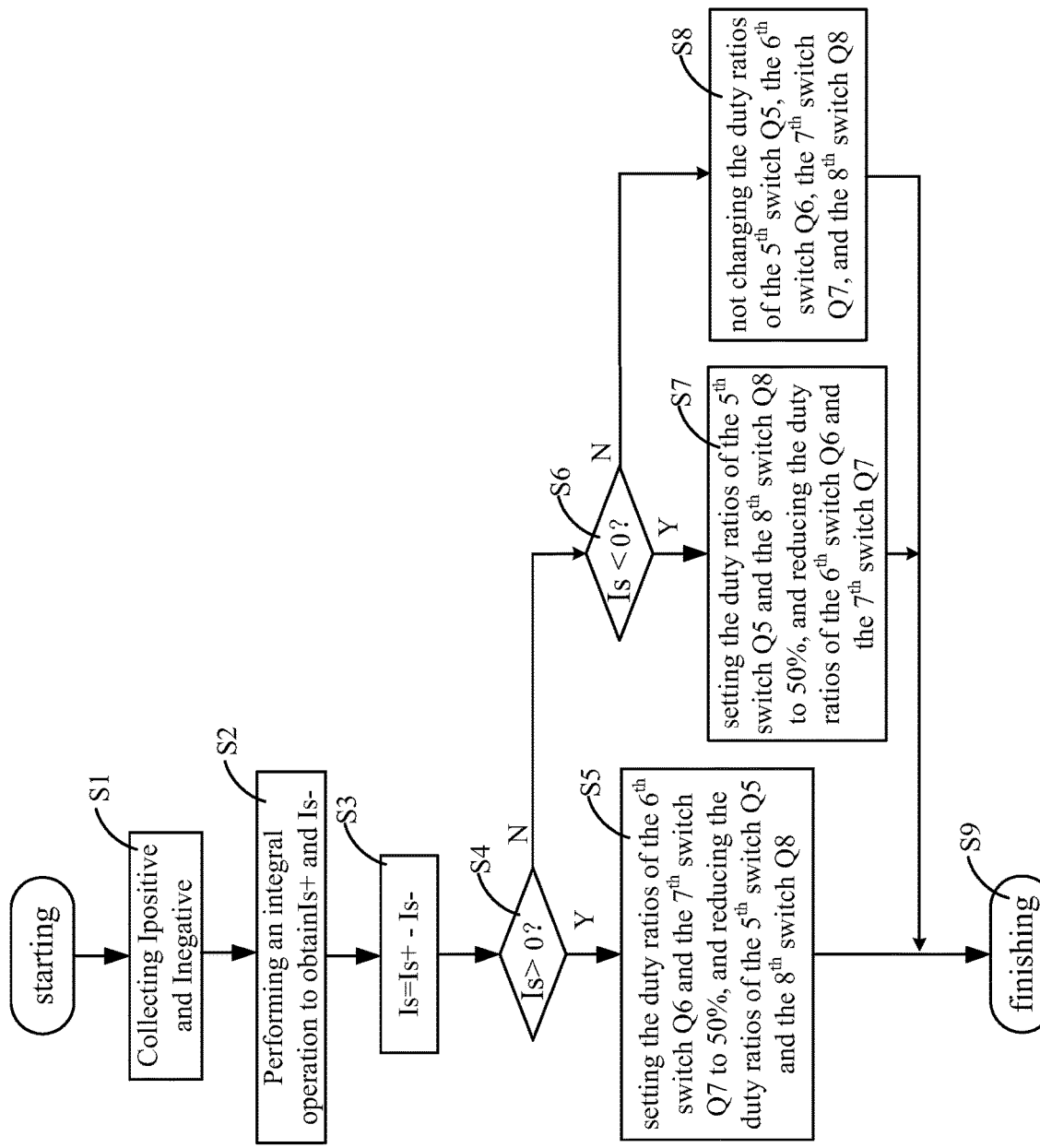
FIG. 11 is the control flow block diagram of one embodiment in the invention.

With reference to the flow chart of an embodiment shown in FIG. 11, a method for controlling a magnetic balance circuit of a bidirectional resonant converter, comprising the following steps:

S1: collecting the positive component Ipositive of the current in the cavity of said secondary conversion circuit and the negative component Inegative of the current in the cavity of said secondary conversion circuit, S2: performing an integral operation on the positive component Ipositive to obtain a positive component integral $Is^+$, performing an integral operation on the negative component Inegative to obtain a negative component integral $Is^-$, S3: subtracting said negative component integral Is from said positive component integral $Is^+$ to obtain difference Is, S4: Judging whether the difference Is is greater than zero, if yes, shifting to step 5, otherwise shifting to step 6, S5: setting the duty ratios of the $6^{th}$ switch Q6 and the $7^{th}$ switch Q7 to 50%, and reducing the duty ratios of the $5^{th}$ switch Q5 and the $8^{th}$ switch Q8, shifting to step 9, S6: Judging whether the difference Is is less than zero, if yes, shifting to step 7, otherwise shifting to step 8, S7: setting the duty ratios of the $5^{th}$ switch Q5 and the $8^{th}$ switch Q8 to 50%, and reducing the duty ratios of the $6^{th}$ switch Q6 and the $7^{th}$ switch Q7, shifting to step 9, S8: not changing the duty ratios of the $5^{th}$ switch Q5, the $6^{th}$ switch Q6, the $7^{th}$ switch Q7, and the $8^{th}$ switch Q8, shifting to step 9, S9: finishing adjusting the duty ratio.

Figure 12:
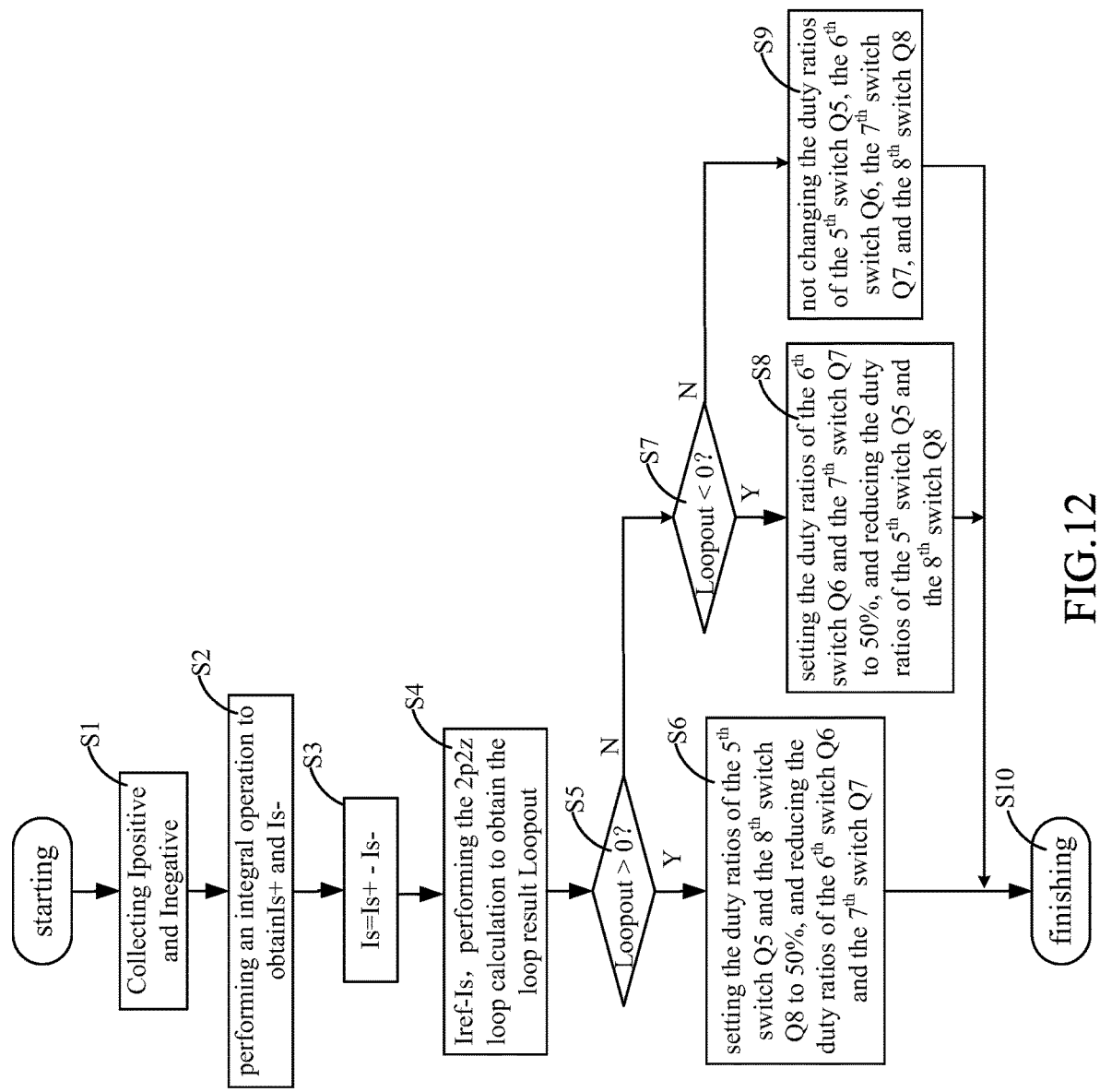
FIG. 12 is the control flow block diagram of another embodiment in the invention.

With reference to the flow chart of another embodiment shown in FIG. 12, a method for controlling a magnetic balance circuit of a bidirectional resonant converter, comprising the following steps:

S1: collecting the positive component Ipositive of the current in the cavity of said secondary conversion circuit and the negative component Inegative of the current in the cavity of said secondary conversion circuit, S2: performing an integral operation on the positive component Ipositive to obtain a positive component integral $Is^+$, performing an integral operation on the negative component Inegative to obtain a negative component integral $Is^-$, S3: subtracting said negative component integral Is from said positive component integral $Is^+$ to obtain difference Is, S4: subtracting the current adjustment parameter Iref from the difference Is, and then performing the 2p2z loop calculation to obtain the loop result Loopout, S5: Judging whether the loop result Loopout is greater than zero, if yes, shifting to step 6, otherwise shifting to step 7, S6: setting the duty ratios of the $5^{th}$ switch Q5 and the $8^{th}$ switch Q8 to 50%, and reducing the duty ratios of the $6^{th}$ switch Q6 and the $7^{th}$ switch Q7, shifting to step 10, S7: Judging whether the loop result Loopout is less than zero, if yes, shifting to step 8, otherwise shifting to step 9, S8: setting the duty ratios of the $6^{th}$ switch Q6 and the $7^{th}$ switch Q7 to 50%, and reducing the duty ratios of the $5^{th}$ switch Q5 and the $8^{th}$ switch Q8, shifting to step 10, S9: not changing the duty ratios of the $5^{th}$ switch Q5, the $6^{th}$ switch Q6, the $7^{th}$ switch Q7, and the $8^{th}$ switch Q8, shifting to step 10, S10: finishing adjusting the duty ratio.

It should be pointed out that when all the components are in an ideal state, the duty ratio of the $5^{th}$ switch Q5, the $6^{th}$ switch Q6, the $7^{th}$ switch Q7, and the $8^{th}$ switch Q8 are all 50%, $Is^+=Is^-$, $Is=0$. Thus the converter achieves magnetic balance. As each switch parameter has slight difference and suffers interference, when the duty ratio is 50%, that is $Is^+ \neq Is^-$, which can be adjusted by setting the current adjustment parameter Iref. In a preferred embodiment, the current adjustment parameter Iref is equal to zero (0).

With reference to FIG. 9, a preferred embodiment of the control principle diagram is shown in the invention, illustrating how the steps of the invention are implemented in the controller. ADCA in the controller performs an integral operation on the positive component Ipositive to obtain a positive component integral $Is^+$, ADCB performs an integral operation on the negative component Inegative to obtain a negative component integral Is and then performs subtraction in the subtractor, $Is=Is^+-Is^-$. The current adjustment parameter Iref is subtracted from Is, and then the 2p2z loop calculation is performed to obtain the loop result Loopout: The PWM driver outputs the PWM control signals of Q6, Q7, Q5, and Q8 according to the result of Loopout.

Figure 10:
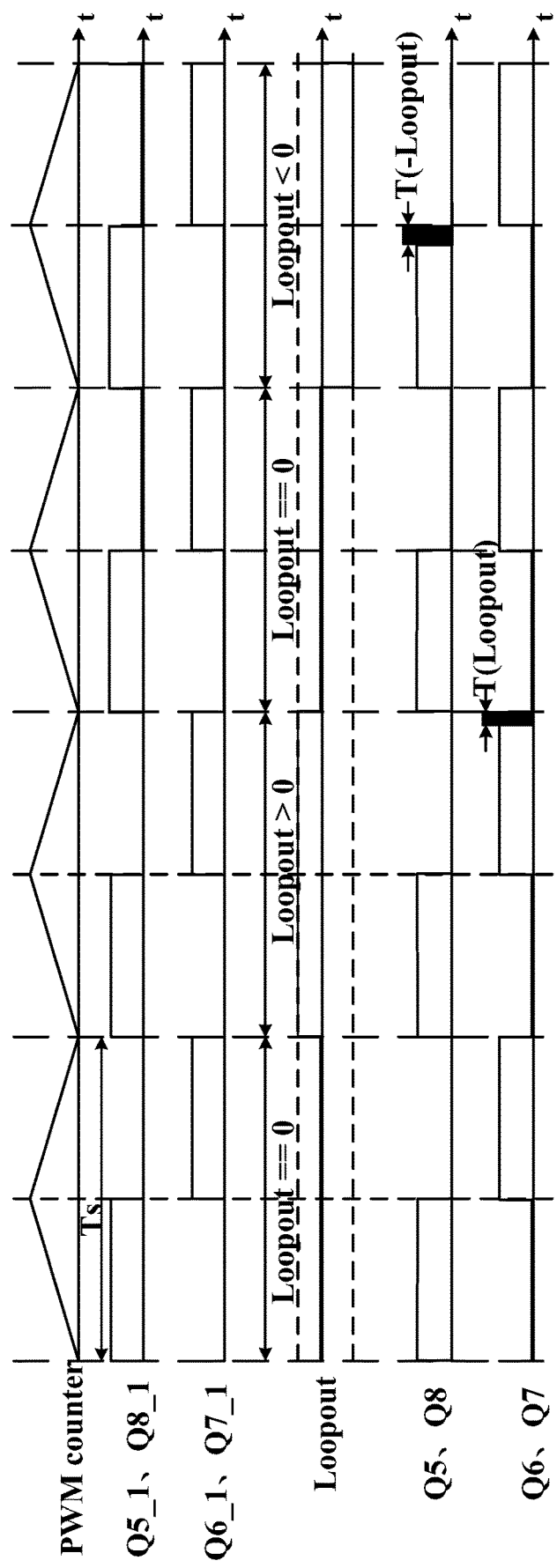
FIG. 10 is the schematic diagram of adjusting the duty ratio of the power switch of the secondary conversion circuit in the invention.

The schematic diagram of controlling the PWM control signal according to the loop result Loopout is shown in FIG. 10. The left part of the figure is Loopout=0, and the duty ratios of the $5^{th}$ switch Q5, the $6^{th}$ switch Q6, the $7^{th}$ switch Q7, and the $8^{th}$ switch Q8 are all 50%. The middle part of the figure is Loopout>0, the duty ratios of the $5^{th}$ switch Q5 and the $8^{th}$ switch Q8 are set to 50%, and the duty ratios of the $6^{th}$ switch Q6 and the $7^{th}$ switch Q7 are reduced. The right part of the figure is Loopout<0, the duty ratios of the $6^{th}$ switch Q6 and the $7^{th}$ switch Q7 are set to 50%, and the duty ratios of the $5^{th}$ switch Q5 and the $8^{th}$ switch Q8 are reduced.

In addition, the positive component Ipostive and the negative component Inegative are respectively sent to the positive input terminals of the two internal comparators of the controller. The comparison reference value of the negative input terminal is set by software, and the comparison result is sent to the PWM module for peak value overcurrent protection.

The above embodiments are only examples and do not serve as a limitation. Any equivalent modifications or changes made to them without departing from the spirit and scope of the invention shall be included in the protection scope of the claims of the invention.

What is claimed is:

1. A magnetic balance circuit of a bidirectional resonant converter, comprising:
    a primary conversion circuit;
    a transformer having a primary winding and a first secondary winding, wherein said primary conversion circuit is connected to the primary winding of said transformer through a first capacitor;
    a secondary conversion circuit including a secondary first conversion circuit, a secondary second conversion circuit, a cavity, and a current transformer, wherein said secondary first conversion circuit includes a plurality of switches, the current transformer is set between the first secondary winding of said transformer and said secondary first conversion circuit, and said secondary first conversion circuit is connected to the first secondary winding of said transformer, and wherein the plurality of switches of said secondary first conversion circuit includes a fifth switch, a sixth switch, a seventh switch, and an eighth switch, the fifth switch and the seventh switch are connected in series up and down to form a first bridge arm, and the sixth switch and the eighth switch are connected in series up and down to form a second bridge arm, the fifth switch and the eighth switch operate synchronously, and the sixth switch and the seventh switch operate synchronously; and
    a controller, configured to control duty ratios of the plurality of switches of said secondary first conversion circuit by:
        collecting a positive current component of a current in the cavity of said secondary conversion circuit and a negative current component of the current in the cavity of said secondary conversion circuit;
        performing an integral operation on the positive current component to obtain a positive current component integral, and performing an integral operation on the negative current component to obtain a negative current component integral;
        subtracting said negative current component integral from said positive current component integral to obtain a difference; and then
        controlling the duty ratios of the plurality of switches of said secondary first conversion circuit based on the difference, wherein:
            when the difference is greater than zero, the duty ratios of the sixth switch and the seventh switch are set to 50%, and the duty ratios of the fifth switch and the eighth switch are reduced;
            when the difference is less than zero, the duty ratios of the fifth switch and the eighth switch are set to 50%, and the duty ratios of the sixth switch and the seventh switch are reduced; and
            when the difference is equal to zero, the duty ratios of the fifth switch, the sixth switch, the seventh switch, and the eighth switch are not changed.

2. The magnetic balance circuit according to claim 1, wherein said transformer further includes a second secondary winding and a third secondary winding, and said secondary second conversion circuit is connected with the second secondary winding of said transformer and the third secondary winding of said transformer.

3. The magnetic balance circuit according to claim 1, wherein the controller is configured to control the duty ratios of the plurality of switches of said secondary first conversion circuit based on the difference in a sequential order by:
    firstly, in response to determining the difference to be greater than zero, setting the duty ratios of the sixth switch and the seventh switch to 50%, and reducing the duty ratios of the fifth switch and the eighth switch;
    secondly, in response to determining the difference to be less than zero, setting the duty ratios of the fifth switch and the eighth switch to 50%, and reducing the duty ratios of the sixth switch and the seventh switch; and then
    thirdly, in response to determining the difference to be equal to zero, not changing the duty ratios of the fifth switch, the sixth switch, the seventh switch, and the eighth switch.

4. The magnetic balance circuit according to claim 1, wherein the controller is further configured to control the duty ratios of the plurality of switches of said secondary first conversion circuit based on the difference by:
    subtracting a current adjustment parameter from the difference, and then performing a two-pole/two-zero (2p2z) loop calculation to obtain a loop result;
    in response to determining the loop result to be greater than zero, setting the duty ratios of the sixth switch and the seventh switch to 50%, and reducing the duty ratios of the fifth switch and the eighth switch;

in response to determining the loop result to be less than zero, setting the duty ratios of the fifth switch and the eighth switch to 50%, and reducing the duty ratios of the sixth switch and the seventh switch; and in response to determining the loop result to be equal to zero, not changing the duty ratios of the fifth switch, the sixth switch, the seventh switch, and the eighth switch.

5. The magnetic balance circuit according to claim 4, wherein said current adjustment parameter is equal to 0.

6. A method for controlling a magnetic balance circuit of a bidirectional resonant converter, wherein said magnetic balance circuit comprises:
a primary conversion circuit;
a transformer having a primary winding and a first secondary winding, wherein said primary conversion circuit is connected to the primary winding of said transformer through a first capacitor;
a secondary conversion circuit including a secondary first conversion circuit, a secondary second conversion circuit, a cavity, and a current transformer, wherein said secondary first conversion circuit includes a plurality of switches, the current transformer is set between the first secondary winding of said transformer and said secondary first conversion circuit, and said secondary first conversion circuit is connected to the first secondary winding of said transformer, and wherein the plurality of switches of said secondary first conversion circuit includes a fifth switch, a sixth switch, a seventh switch, and an eighth switch, the fifth switch and the seventh switch are connected in series up and down to form a first bridge arm, and the sixth switch and the eighth switch are connected in series up and down to form a second bridge arm, the fifth switch and the eighth switch operate synchronously, and the sixth switch and the seventh switch operate synchronously; and
a controller;
wherein the method comprises:
collecting, by the controller, a positive current component of a current in the cavity of said secondary conversion circuit and a negative current component of the current in the cavity of said secondary conversion circuit;
performing, by the controller, an integral operation on the positive current component to obtain a positive current component integral, and performing an integral operation on the negative current component to obtain a negative current component integral;
subtracting, by the controller, said negative current component integral from said positive current component integral to obtain a difference; and then
controlling, by the controller, the duty ratios of the plurality of switches of said secondary first conversion circuit based on the difference, wherein:
when the difference is greater than zero, the duty ratios of the sixth switch and the seventh switch are set to 50%, and the duty ratios of the fifth switch and the eighth switch are reduced;
when the difference is less than zero, the duty ratios of the fifth switch and the eighth switch are set to 50%, and the duty ratios of the sixth switch and the seventh switch are reduced; and
when the difference is equal to zero, the duty ratios of the fifth switch, the sixth switch, the seventh switch, and the eighth switch are not changed.

7. The method according to claim 6, wherein said transformer further includes a second secondary winding and a third secondary winding, and said secondary second conversion circuit is connected with the second secondary winding of said transformer and the third secondary winding of said transformer.

8. The method according to claim 6, wherein the step of controlling, by the controller, the duty ratios of the plurality of switches of said secondary first conversion circuit based on the difference comprises, in a sequential order:
firstly, in response to determining the difference to be greater than zero, setting the duty ratios of the sixth switch and the seventh switch to 50%, and reducing the duty ratios of the fifth switch and the eighth switch;
secondly, in response to determining the difference to be less than zero, setting the duty ratios of the fifth switch and the eighth switch to 50%, and reducing the duty ratios of the sixth switch and the seventh switch; and then
thirdly, in response to determining the difference to be equal to zero, not changing the duty ratios of the fifth switch, the sixth switch, the seventh switch, and the eighth switch.

9. The method according to claim 6, wherein the step of controlling, by the controller, the duty ratios of the plurality of switches of said secondary first conversion circuit based on the difference further comprises:
subtracting a current adjustment parameter from the difference, and then performing a two-pole/two-zero (2p2z) loop calculation to obtain a loop result;
in response to determining the loop result to be greater than zero, setting the duty ratios of the sixth switch and the seventh switch to 50%, and reducing the duty ratios of the fifth switch and the eighth switch;
in response to determining the loop result to be less than zero, setting the duty ratios of the fifth switch and the eighth switch to 50%, and reducing the duty ratios of the sixth switch and the seventh switch; and
in response to determining the loop result to be equal to zero, not changing the duty ratios of the fifth switch, the sixth switch, the seventh switch, and the eighth switch.

10. The method according to claim 9, wherein said current adjustment parameter is equal to 0.

* * * * *